Dec. 6, 1960          H. C. ROTHE          2,963,243
SPACE VEHICLE GUIDANCE MECHANISM AND METHOD
Filed March 4, 1959          5 Sheets-Sheet 2

HEINRICH C. ROTHE,
INVENTOR.

BY S. J. Rotondi,
A. T. Dupont,
H. M. Snyder, and
Alvin E. Moore,
ATTORNEYS.

Dec. 6, 1960           H. C. ROTHE           2,963,243
SPACE VEHICLE GUIDANCE MECHANISM AND METHOD
Filed March 4, 1959                         5 Sheets-Sheet 4

HEINRICH C. ROTHE,
INVENTOR.

BY S. J. Rotondi,
A. T. Dupont,
H. M. Snyder, and
Alvin E. Moore,
ATTORNEYS.

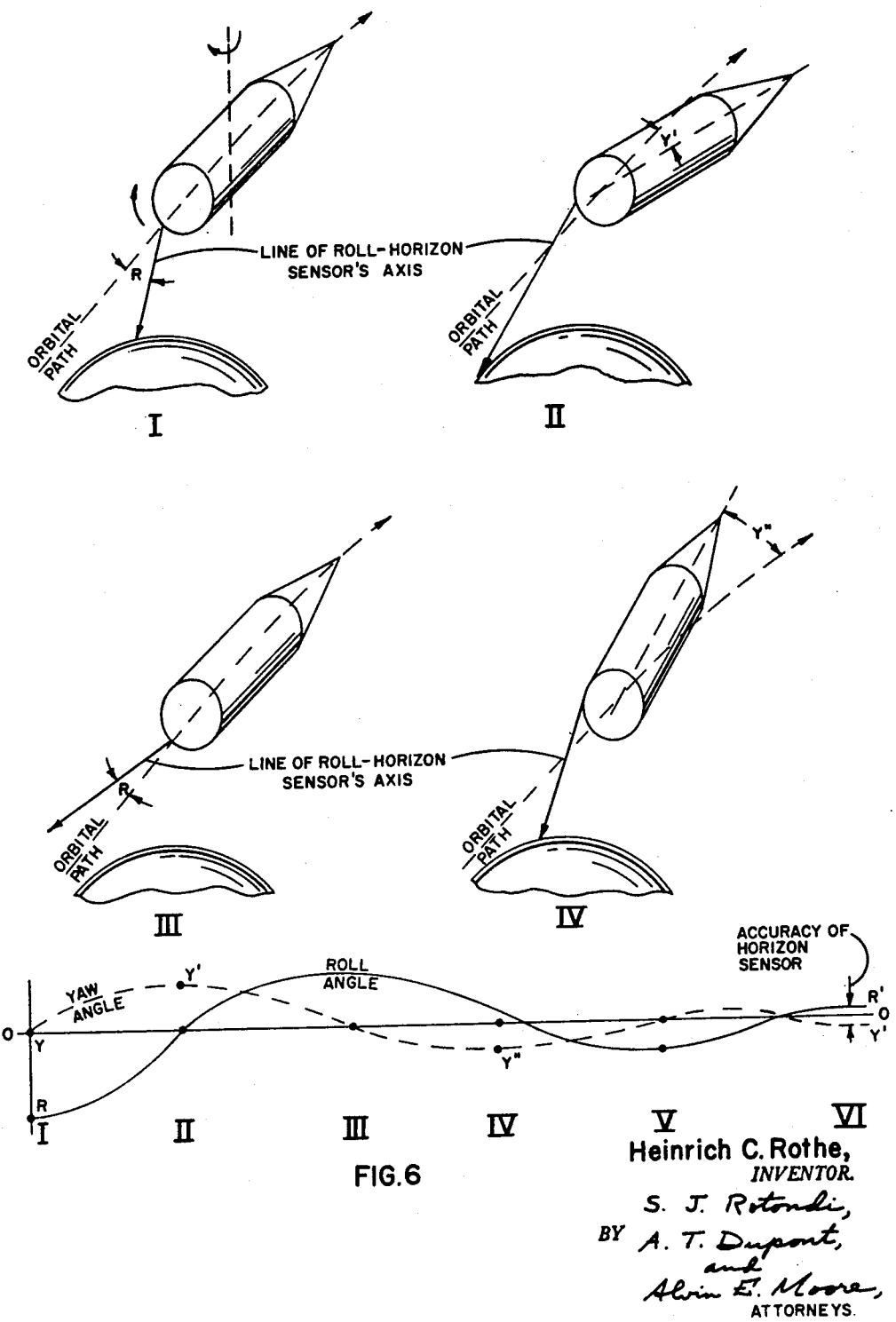

United States Patent Office 2,963,243
Patented Dec. 6, 1960

2,963,243

SPACE VEHICLE GUIDANCE MECHANISM AND METHOD

Heinrich C. Rothe, 3902 Hawthorne Ave., SW., Huntsville, Ala.

Filed Mar. 4, 1959, Ser. No. 797,318

6 Claims. (Cl. 244—14)

(Granted under Title 35, U.S. Code (1952), sec. 266)

The invention described herein may be manufactured and used by or for the Government for governmental purposes without the payment of any royalty thereon.

This invention relates to a space vehicle guidance mechanism and method. Known proposals for the guidance of an artificial satellite comprise a stabilized platform that is universally mounted on the vehicle and is of the general type that has been used in the guidance of ballistic missiles. This platform normally has a stabilizing gyroscope for each of the satellite's pitch, roll and yaw axes. When the space vehicle departs from its predetermined position relative to the platform an electrical signal is supplied to a mechanism, which may comprise jet motors or motor driven flywheels, for bringing the vehicle back into the desired attitude. Since the stabilizing gyroscopes inherently have some drift the position of the platform in space tends to change, and the resulting inaccuracy prevents efficient use of this known missile guidance mechanism in the attitude control of an orbiting space vehicle, unless some means of supervision of the stabilizing gyroscopes is provided.

One supervising means that has been suggested comprises known horizon sensors, for example of the infrared type, which sense a change in the platform's parallelism relative to the horizon and supply a signal to an electro-magnetic, torque-providing element. This torque places a correcting, precession-causing torque on the gyroscope of either the pitch-axis or the roll-axis gyroscope, depending on whether the platform has departed from its horizon-parallel attitude about the pitch axis or the roll axis.

This horizon-oriented platform has the defect that it provides no way of correcting for deviation of the platform about the yaw axis. In this proposal it apparently has been assumed that, since the yaw axis is perpendicular to the horizon, the platform may turn in either direction without appreciably affecting either the roll or the pitch horizon sensor; and accordingly some means for separately indicating error in yaw has been suggested, for example, a rate gyroscope for supervision of the yaw-axis gyroscope. This separate means involves complexity and the possibility of inaccuracy. An important problem therefore exists in the provision of a horizon-sensing and gyroscopically stabilized satellite (or guidance platform) which not only will remain parallel to the horizon but will efficiently maintain a predetermined attitude about its yaw axis.

Accordingly, a principal object of this invention is to provide such a satellite that is gyroscopically stabilized about all three of its main axes in a simple and efficient manner.

Another object of the invention is to provide a gyroscopically stabilized, inertial guidance platform for a satellite or other space vehicle that is maintained in a desired attitude relative to each of its roll, pitch and yaw axes.

A further object is to provide a space vehicle inertial guidance platform that is stabilized about its roll, pitch and yaw axes by means of a combination of three stabilizing gyroscopes, two horizon sensors, and connections between the sensors and gyroscopes, said combination providing efficient supervision by the two sensors of all three of the gyroscopes.

The foregoing and other objects of the invention will become more fully apparent from the following detailed description of exemplary structure embodying the invention and from the accompanying drawings, in which:

Figure 6 is a diagrammatic showing of steps in the correction of a deviation about the roll body-axis of a satellite in orbit, and of the accompanying temporary yaw deviation that develops from the roll correction.

Figure 1:
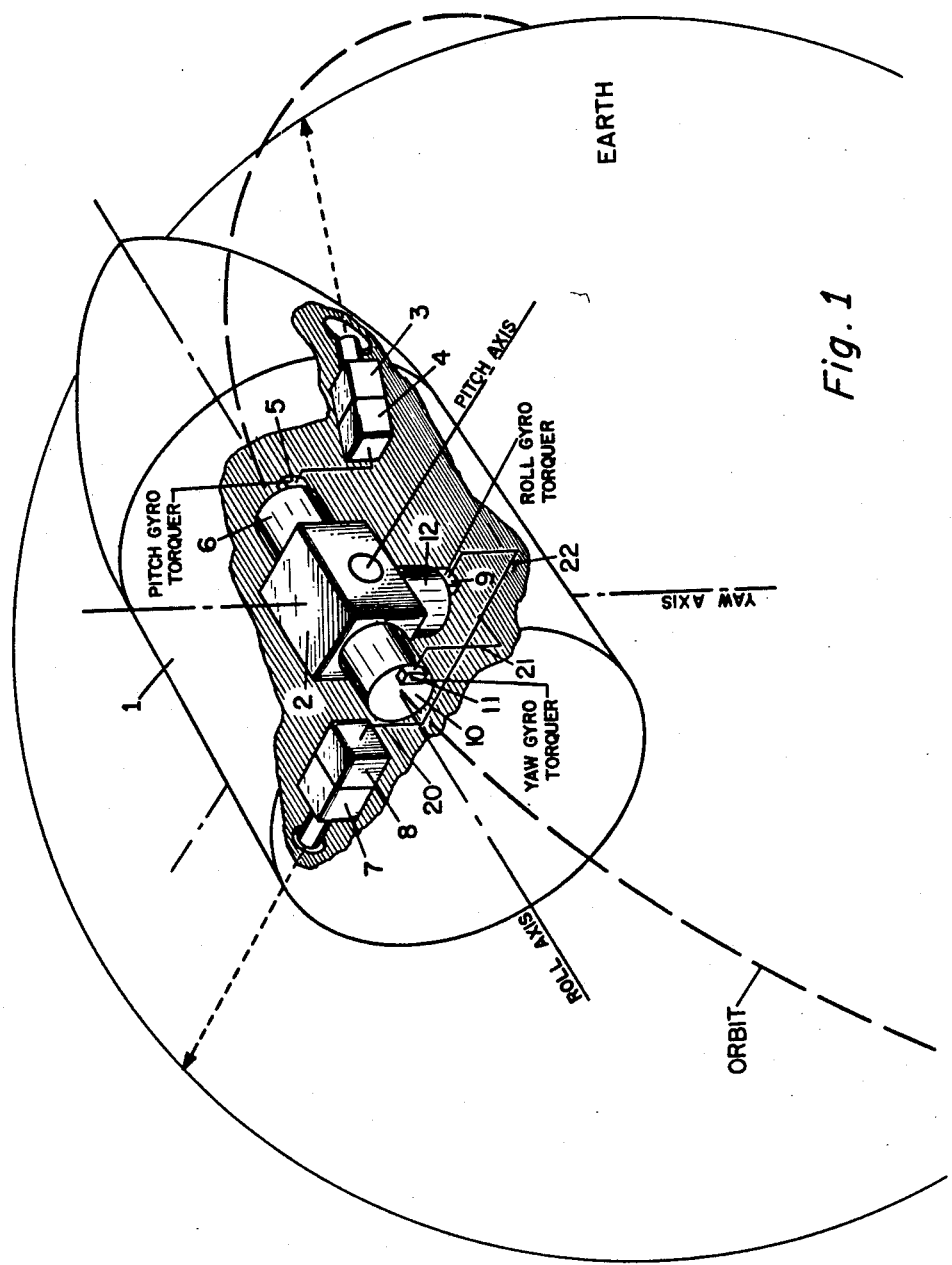
Figure 1 is a semi-schematic view of a satellite or other space vehicle, with part of its housing broken away to expose a schematically indicated inertial guidance mechanism.

In Figure 1, the numeral 2 indicates a spatially, gyroscopically stabilized platform or support that is mounted in a satellite or other space vehicle, 1. This guidance device is of a type that is generally known in the missile art, and for example may be of the design shown in copending application Serial No. 794,212, filed on February 18, 1959, by Fritz K. Mueller. If the satellite is of small dimensions and mass, platform 2 may be fixed to the vehicle's housing, and its pitch, yaw and roll gyroscopes, 6, 10 and 12, respectively, may be utilized directly (in connection with a known jet or flywheel attitude control system) for control of the satellite's attitude. In larger satellites, however, platform 2 preferably is mounted on gimbals, in a known manner, for example as shown in said copending application, and electrical signals that result from deviations of the vehicle from its predetermined attitude relative to the stabilized platform are utilized, for control of the satellite's attitude. In either of these species, element 2 may be called a stabilized platform or support.

Figure 2:
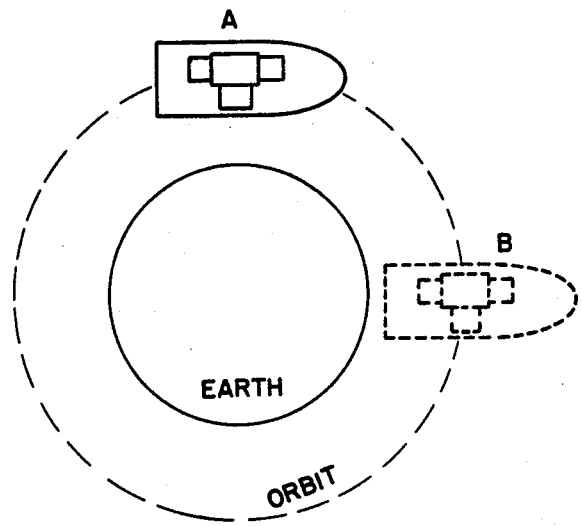
Figure 2 is a diagrammatic view of a gyroscopically-stabilized satellite, showing the orientation of the satellite that would occur at two points in its orbit if there were no supervision of its pitch-axis gyroscope.
Figure 3:
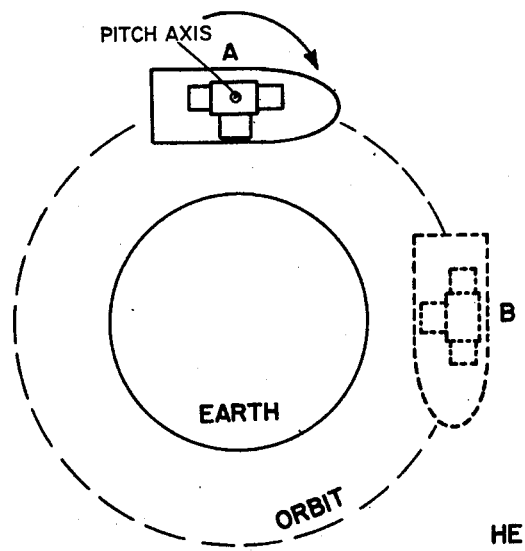
Figure 3 is a diagrammatic view of a gyroscopically stabilized satellite, having means for supervision of its gyroscopes, showing its correct orientation at two points in its orbit.

In the desired attitude of the vehicle: (1) the pitch axis is perpendicular to the flight path and parallel to the earth's surface; (2) the yaw axis is perpendicular to the flight path and perpendicular to the earth's surface; and (3) the roll axis is parallel to the flight path and parallel to the earth's surface. For these conditions to be achieved in an orbiting satellite, whereby stabilized platform 2 (and satellite 1) will have the same side toward the earth throughout its orbit, the vehicle must be continuously rotated about its pitch axis in the direction indicated by the arrow in Figure 3. If such continuous rotation were not provided the satellite, stabilized in space by means of its three gyroscopes, would continually change its position relative to the horizon, as indicated in Figure 2.

In the structure that is schematically shown in Figure 1, the continuous alignment in parallelism with the horizon is made possible by the pitch-axis horizon sensor or scanner 3. This instrument may be one of the various known types of horizon sensors. Such devices, which for example may comprise thermal detectors, active or passive guidance radar seekers, and pendulum systems with means for compensating for the pendulum inaccuracies that are caused by accelerations other than gravity, are used for determining the attitude of a space vehicle relative to the horizon, and are obtainable from suppliers of missile guidance equipment. Two thermal detectors that for example may be used as horizon sensors are illustrated in the treatise Principles of Guided Missile Design, Grayson Merrill, editor, New York, 1955, pp. 144 to 156. One of these detectors is a thermocouple, exposed to a given field of radiation—which in the present invention would be that from the vicinity of the horizon; and the other type comprises a blackened film in front of a pneumatic chamber, a lens, grid and a photoelectric cell. Either of these detectors will be sensitive to the difference between the infra-red light emitted from the earth and that sent out from neighboring sky at the horizon; and it would function whether or not the space vehicle is orbiting at the angular speed of the earth's rotation. An example of a horizon sensor and its mounting on a vehicle that may be utilized is shown in Patent No. 2,740,961 to J. M. Slater.

The known type of photoelectric sensor that is sensitive to daylight also may be utilized. But in the use of this horizon detector on a high-speed satellite the gyroscopes only would be relied on for stabilization during the brief periods when the vehicle comes within the earth's shadow.

The horizon sensor may be fixed either to the satellite's housing or to the stabilized platform. In either event, the scanner indicates any change in its line of sight toward the horizon by a signal voltage, the polarity of which is dependent on whether the scanner's line of sight has shifted to a point above or below the horizon. This voltage is amplified in amplifier 4, and supplied to electromagnetic torquer 5 (of a known type) which places a torque on the spinning mass of pitch-axis gyroscope 6. Due to this torque the gyroscope will precess in such a direction as to move the platform and/or vehicle in correction for its deviation about the pitch axis. If the vehicle is a satellite, or other space vehicle traversing a path parallel to the horizon, this correction about the pitch axis will be continual, and in addition to intermittent correction for undesired movement of the platform about the pitch axis, due to the drift of the pitch gyroscope or to other stability-disturbing factors.

Such intermittent correction is also provided to correct for deviations of the platform relative to the roll and yaw axes.

For correction relative to the roll axis, mechanism is provided that is similar to that described above in connection with the pitch axis. Roll horizon scanner 7, which may be mounted either on the vehicle's housing or on the stabilized platform, senses any angle developed between its line of sight and its proper alignment with the horizon. The resulting signal voltage, of a polarity depending on whether the roll scanner's line of sight has shifted to a point above or below the horizon, is amplified in amplifier 8, and supplied to torquer 9. This torquer then places a torque on roll gyroscope 12 and, in a known manner, causes gyroscope 12 to precess and correct the roll attitude of the platform.

The present inventor has discovered that the roll horizon scanner, 7; not only senses, and may be utilized in the correction of, any error in roll as pointed out above, but also may be utilized for indicating any error in yaw and as an element in a combination that corrects for such error in yaw. This dual use of the roll horizon scanner is indicated in Figures 4 and 5.

Figure 4:
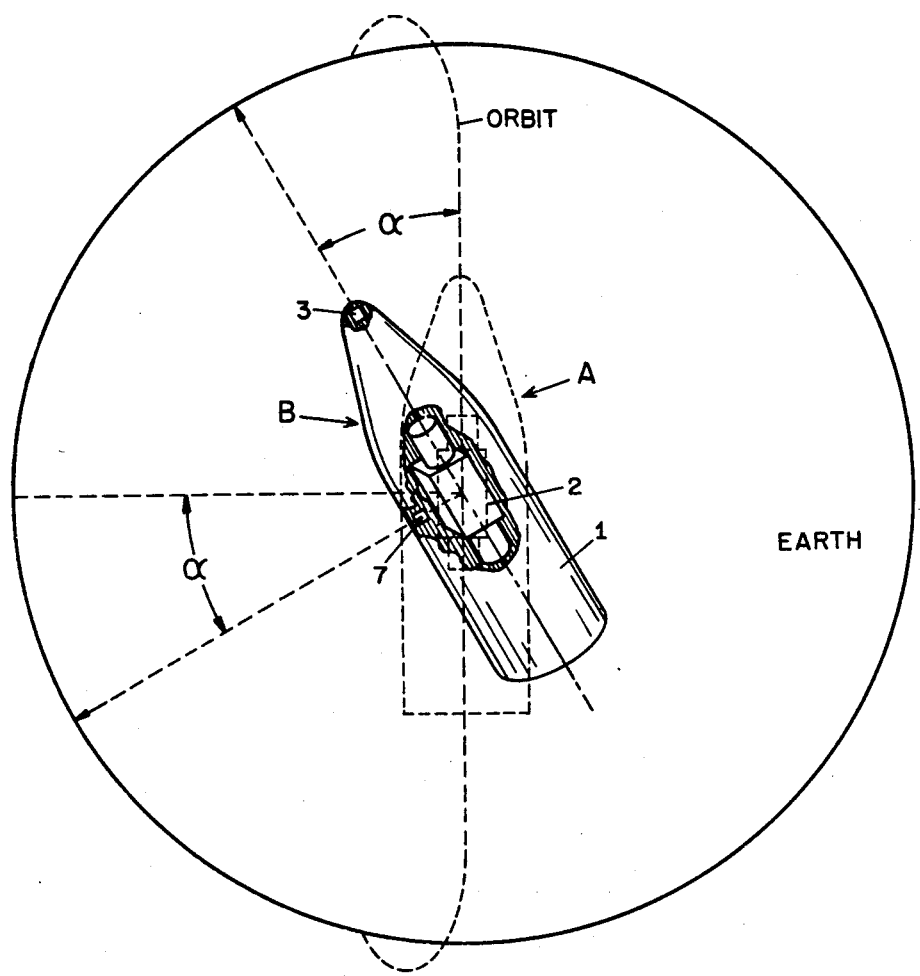
Figure 4 is a schematic, plan view of the satellite of Figure 3, showing it as having developed an error about its yaw axis at another point in its orbit.
Figure 5:
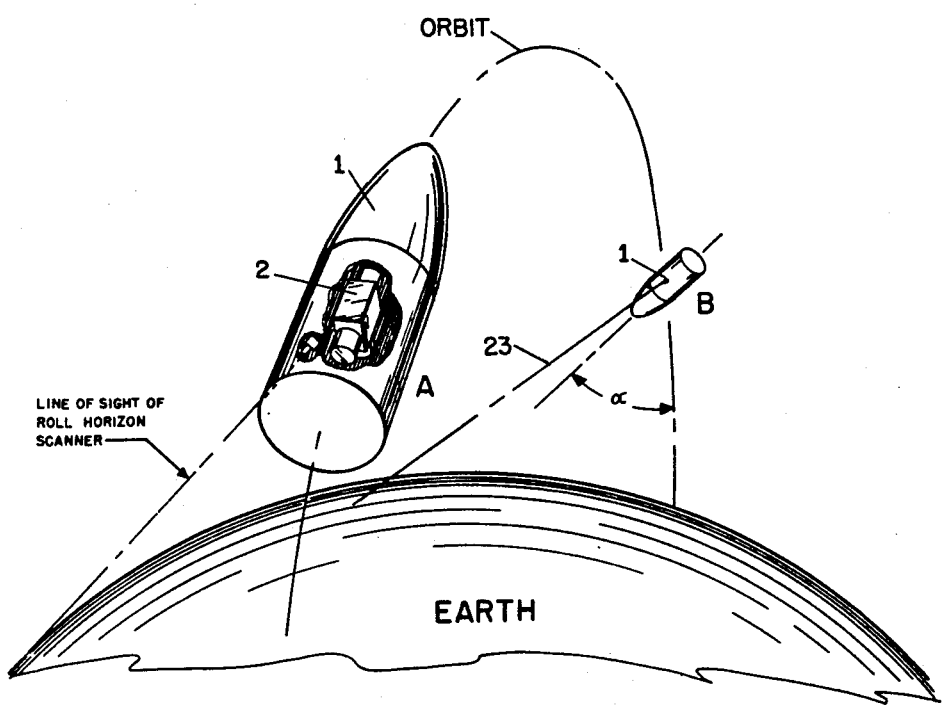
Figure 5 is a schematic, perspective view of the satellite in orbit, indicating the fact that when it deviates about its yaw axis the roll-axis horizon sensor and its connections, of the present invention, serve to indicate the satellite's deviation in yaw and to correct for it thru the yaw gyroscope.

In Figure 4, stabilized platform 2 and satellite vehicle 1 are shown as displaced from their proper attitude relative to the yaw axis by an angle α, caused by drift of the yaw gyroscope or by other influences affecting the stability in yaw of the platform. Unless there is some means of correcting for such deviation the platform and vehicle conceivably could drift from its desired attitude in yaw thru an angle of 90° or more. With such an angle of 90°, for extreme example, roll horizon scanner 7 would have moved until it is in a position comparable to the previous, correct-attitude position of pitch horizon scanner 3, in that the roll scanner in its new position indicates a continual change of the platform relative to the horizon. In other words, the roll scanner in this extreme position would be sending into its amplifier 8 and roll gyroscope torquer 9 a continuously changing signal proportional to the angular speed of the satellite around the earth. This signal from the roll scanner thus would indicate deviation of the platform's attitude about the yaw axis. For any deviation angle in yaw that is smaller than 90°, a smaller proportion of the satellite's angular rate is sensed by the roll horizon scanner and indicated by a signal voltage.

The polarity of this voltage depends on the orientation of the line of sight of the roll horizon scanner. As indicated in Figure 5, the line of sight is at the horizon in correct-attitude position A of the satellite, but has shifted, as indicated by line 23, to a position toward the center of the earth after the orbiting vehicle has shifted in a counter-clockwise direction about its yaw axis, thru the angle α. When this deviation in yaw first occurs, for an instant the line of sight 23 of the roll horizon scanner remains pointed toward the horizon. An instant later, the line of sight (which is the axis of the scanner) has shifted so as to point more toward the center of the earth. This shift has occurred because of the fact that the stabilized scanner support and the scanner axis are holding their position in space relative to the roll axis (albeit not relative to the pitch axis), and in consequence the axis of the scanner has shifted relative to the horizon. This shifting line thus indicates a shift in roll relative to the horizon—that is a relative error in roll. This error leads to a signal. When this signal builds up to a predetermined amount (indicating a fraction of a degree, depending on the engineering design of amplifier 8), the amplifier supplies sufficient current to conductor 22 to operate the roll gyroscope torquer, and simultaneously sufficient current to conductor 21 to operate the yaw gyroscope torquer, and thus correct an increment of the deviation in yaw.

The degree of this increment of yaw correction depends on the relative error in roll (relative to the horizon) that has been built up due to shift of the satellite and roll scanner in orbit. This degree of correction in yaw may or may not be the total error in yaw. In Figure 5 this total error, α, is shown as being extreme, such as seldom would occur in the orbit. Assuming that this error in yaw is greater than its resulting error in roll relative to the horizon that has led to the signal, it will be seen that when this error in roll is fully corrected, and line of sight 23 is again on the horizon, there will remain, uncorrected, part of the error in yaw. Therefore, an instant later another increment of error in roll relative to the horizon is indicated by the scanner. The corresponding increment of correction in roll then is made by amplifier 8 and the roll gyroscope torquer; and simultaneously another increment of correction in yaw is made by the amplifier and the yaw gyroscope. This process continues until the amount of yaw error that is remaining is equal to or less than said increment of error in roll. Then the roll scanner causes still another increment of correction in roll. If this increment is the same as the remaining yaw error (and both torquers provide equal corrections) the satellite (scanner support) thereupon is stablized. If, on the other hand, the last increment in roll is larger than the remaining yaw error, the yaw gyroscope torquer may slightly overcorrect, so that an oppositely directed error in yaw, and consequent oppositely directed relative error in roll may develop.

This over-correction, if any, would be very slight, due to the fact that amplifier 8 (as well as amplifier 4) includes a known type of damping network, which quickly would damp the seesawing of the satellite (and line of sight 23) relative to the horizon.

In correction of any error in roll that has developed, without an accompanying error in yaw, a temporary error in yaw will occur in the process of correcting the roll error. If the roll error, for example, is counterclockwise relative to the roll axis of the satellite the roll sensor 10 senses that its side of the vehicle has rolled toward the center of the earth and sends a signal to roll gyro torquer 9, which induces a clockwise corrective roll. At the same time a signal goes from the roll sensor, via conductor 21, to yaw gyro torquer 11, thus inducing a clockwise yaw about the yaw axis. Since this undesired clockwise yaw for the moment helps reduce the roll error, one who analyzes these interacting motions in roll and yaw might conclude that the signal becomes zero while there is an undesired clockwise yaw and an undesired counterclockwise roll.

This conclusion would not be correct, however, because of the fact that it is impossible to have a zero signal while the vehicle has an error in attitude about its roll axis. Oscillatory, corrective, damped roll-motion about the vehicle's roll axis (with accompanying motion about the yaw axis) continues until the vehicle is again in its desired roll and yaw attitude, within the desired range of accuracy.

An understanding of the process by which the above-mentioned counterclockwise roll-angle error (with no original yaw error) is corrected is aided by consideration of the following facts:

(1) A signal which puts torques on the roll and yaw gyroscopes is caused only by a roll of the vehicle relative to the horizon. This roll relative to the horizon is due to one or both of two motions: (a) roll of the vehicle about its roll body-axis; (b) departure of the vehicle from its desired (zero) attitude about its yaw axis and its subsequent orbiting around the earth while this departure persists. If, for example, there are both counterclockwise roll and counterclockwise yaw (that is, counterclockwise from the point of view of a person looking forward or downward on the vehicle), both factors (a) and (b) are operating to roll the vehicle (and the line of sight of its roll sensor) relative to the horizon toward the center of the earth. If, on the other hand, one of these two factors is clockwise the two factors are in opposition, and the speed and angular distance of the sensor's roll are smaller than if the two are functioning in the same direction. The same considerations apply to the corrective motion of the vehicle under the influence of its roll and yaw gyroscope torquers.

Steps in the correction of the above-mentioned counterclockwise roll (with no original yaw error) are indicated in the diagrams of Figure 6. The roll-angle of deviation about the roll axis (O—O) is indicated by curve R—R'; and the yaw-angle of deviation about the yaw axis (O—O) is indicated by curve Y—Y'. Selected steps in the correction of the roll error are indicated at I, II, III, IV and V.

The total angular speed of roll of the vehicle relative to the horizon consists of the following components: speed of roll of the missile about its own axis (due to energization of the roll gyro torquer), hereafter designated as body-axis roll speed; the speed of roll relative to the horizon that is due to energization of the yaw gyro torquer and subsequent orbiting of the vehicle, hereafter designated as the orbital-roll speed. The third angular speed that is indicated in Figure 6 is the speed of change in yaw, about the vehicle's yaw body-axis; it is designated below as yaw-change speed.

In the beginning of the roll-angle corrective motion, at step I, the roll-angle deviation is counterclockwise and negative by an angle indicated by R, and the yaw-angle deviation is indicated as zero. In this step I the following speed-component conditions exist:

Roll-angle deviation—minus (counterclockwise);
Yaw-angle deviation—zero;
Body-axis roll speed—clockwise, to a satellite passenger;
Orbital-roll speed—zero;
Yaw-change speed—plus (i.e., clockwise about the yaw axis).

From step I to step II the speed of clockwise change in roll relative to the horizon is high due to the fact that both the body-axis roll speed and the orbital-roll speed are in a plus or clockwise direction, and therefore additive. The speed of clockwise change in yaw, however, is relatively low because, unlike the body-axis roll speed, the yaw-change speed has no additional factor added to it to increase its speed due to the signal's influence on a single (yaw) gyro torquer.

At step II the vehicle's roll relative to the horizon has been reduced to zero, but a clockwise (plus) angle of yaw deviation, Y' has developed. Other conditions of step II are:

Body-axis roll speed—zero (i.e. for the instant of step II);
Orbital-roll speed—clockwise;
Yaw-change speed—zero.

From step II to step III the body-axis roll speed is counterclockwise, because the line of sight of the roll sensor is now skyward. But the orbital speed of roll is still clockwise, and therefore is in opposition to the body-axis roll speed. The resultant speed of roll relative to the horizon is now lower than it was in the transition from step I to step II. Therefore the clockwise angle of roll deviation at step III is smaller than the pervious counterclockwise deviation; and yaw deviation at step III has been reduced to zero. Therefore, because the roll-angle deviation is smaller than at the beginning, the resulting signal is decreasing, and the resulting accumulated yaw error is also decreasing with the passage of time.

As is obvious from the curves of Figure 6, this process of damped oscillation across the O—O line continues until the attitudes of the vehicle about both the roll and yaw axes are corrected, and are stabilized, within the horizon-sensor's degree of accuracy.

There are presented below simplified equations, mathematically showing motions of the satellite in response to signals from the roll horizon sensor. In these equations:

R—roll angle;
Y—yaw angle;
C—orbit's angular speed; and
t—time.

$$\frac{dR}{dt} = -W \cdot \sin Y - CR$$

(For small angles sin Y is approximately Y.)

$$\frac{dR}{dt} = -WY - CR$$

$$\frac{dY}{dt} = CR$$

$$\frac{d^2R}{dt^2} = -W\frac{dY}{dt} - C \cdot \frac{dR}{dt}$$

$$\frac{d^2R}{dt^2} = -WCR - C\frac{dR}{dt}$$

$$\frac{d^2R}{dt^2} + C \cdot \frac{dR}{dt} + WCR = 0$$

(The roll-motion equation, of a damped vibration.)

$$R = \frac{dY}{dt \cdot C}$$

$$\frac{dR}{dt} = \frac{d^2Y}{dt \cdot C}$$

$$\frac{d^2Y}{dtC} = -WY - \frac{dY}{dt}$$

$$\frac{d^2Y}{dt} + \frac{C \cdot dY}{dt} + C^1 \cdot WY = 0$$

(The yaw-motion equation, of a damped vibration.)

The invention comprehends various obvious changes in structure from that herein illustrated, within the scope of the subjoined claims.

The following invention is claimed:

1. A spatially stabilized device comprising: a support adapted to travel thru space in a path parallel to the earth's surface, said support being subject to deviation from a predetermined position about pitch, roll and yaw axes; pitch roll, and yaw gyroscopes mounted on said support, one of said gyroscopes stabilizing said support about each of said axes; means for applying a precessing torque on each gyroscope about one of said axes, thus precessing the gyroscope in correction of a deviation of said support from its predetermined position about another of said axes; pitch and roll horizon indicators mounted on said support, supplying signals on deviations of said support from its predetermined position relative to the horizon, said roll horizon indicator indicating any deviation from the predetermined position of said support about said roll axis and also, when said support turns about said yaw axis from its predetermined position in yaw, indicating a deviation in yaw; a power-supplying mechanism connected to said pitch indicator and influenced by a signal from the pitch indicator; a second power-supplying mechanism connected to said roll indicator and influenced by a signal from the roll indicator; power-conducting means connecting said first-mentioned power-supplying mechanism to said means for applying a torque to said pitch gyroscope, for actuating said pitch-gyroscope torque-applying means on deviation of said support from its predetermined position about said pitch axis, whereby said pitch gyroscope precesses in correction of said deviation; a second power-conducting means connecting said second power supplying mechanism to said means for applying a torque to said roll gyroscope, for actuating said roll-gyroscope torque-applying means on deviation of said support from its predetermined position about said roll axis, whereby said roll gyroscope precesses in correction of said deviation in roll; a third power-conducting means connecting said second power-conducting means to said means for applying a torque to said yaw gyroscope, for supplying power to actuate said yaw-gyroscope torque-applying means on deviation of said support from its predetermined position about said yaw axis, whereby said yaw gyroscope precesses in correction of said deviation in yaw.

2. A device as set forth in claim 1, in which said support is a space vehicle.

3. A device as set forth in claim 1, in which said support is an inertial guidance platform, adapted for use in a space vehicle.

4. A device as set forth in claim 1, in which said several means for applying precession torques, said power-supplying mechanisms, and said power-conducting means supply and utilize electrical current.

5. A device as set forth in claim 4, in which said support is an earth satellite vehicle, having an outer casing provided with a pair of windows, and in which said indicators are horizon scanners whose lines of sight to the horizon extend thru said windows and are substantially at right angles to each other.

6. A method of controlling the attitude relative to the horizon of a space vehicle having pitch-axis, roll-axis and yaw-axis stabilizing gyroscopes, comprising: scanning the horizon, by means of pitch and roll sensors, along lines of sight that are perpendicular to each other, thereby sensing deviations of said lines and said vehicle's attitude relative to the horizon about the vehicle's pitch and roll axes; supplying signals indicating the axes about which said deviations occur; supplying power, proportional to the duration of the signal from the pitch horizon scanner, to the pitch-axis gyroscope; supplying power, proportional to the duration of the signal from the roll horizon scanner, simultaneously to the roll-axis gyroscope and to the yaw-axis gyroscope; placing a precessing torque in response to said first-named power on the pitch-axis gyroscope; and placing simultaneous torques on the roll-axis and pitch-axis gyroscopes in response to said second-named power.

References Cited in the file of this patent

UNITED STATES PATENTS 2,879,669    Statsinger    Mar. 31, 1959